(12) United States Patent
Gorcea et al.

(10) Patent No.: US 7,065,143 B1
(45) Date of Patent: Jun. 20, 2006

(54) METHOD AND DESIGN FOR INCREASING SIGNAL TO NOISE RATIO IN XDSL MODEMS

(75) Inventors: Dan V. Gorcea, Kanata (CA); Carl C. Anderson, Kanata (CA); Gyula G. Jakab, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 733 days.

(21) Appl. No.: 10/083,305

(22) Filed: Feb. 26, 2002

Related U.S. Application Data

(60) Provisional application No. 60/271,604, filed on Feb. 26, 2001.

(51) Int. Cl.
*H04B 3/00* (2006.01)

(52) U.S. Cl. .................. 375/258; 375/222; 333/131
(58) Field of Classification Search ............... 375/219, 375/222, 258, 288, 220, 257; 333/24 R, 333/125, 126, 130, 131, 132
See application file for complete search history.

(56) References Cited

U.S. PATENT DOCUMENTS

| | | | | |
|---|---|---|---|---|
| 3,764,753 A | * | 10/1973 | Wisotzky | 379/339 |
| 3,789,315 A | * | 1/1974 | Beurrier | 330/185 |
| 5,210,519 A | * | 5/1993 | Moore | 375/258 |
| 5,301,208 A | * | 4/1994 | Rhodes | 375/258 |
| 5,544,047 A | * | 8/1996 | Appel | 716/1 |
| 6,104,707 A | * | 8/2000 | Abraham | 370/295 |
| 6,323,686 B1 | * | 11/2001 | Bisson et al. | 326/82 |
| 6,459,739 B1 | * | 10/2002 | Vitenberg | 375/258 |
| 6,580,751 B1 | * | 6/2003 | Gardner et al. | 375/222 |
| 6,760,434 B1 | * | 7/2004 | Rezvani et al. | 379/402 |
| 6,804,349 B1 | * | 10/2004 | Prat et al. | 379/402 |
| 2002/0121930 A1 | * | 9/2002 | Gorcea | 330/75 |
| 2003/0085732 A1 | * | 5/2003 | Hernandez-Marti | 326/30 |
| 2004/0064275 A1 | * | 4/2004 | Rakshani et al. | 702/60 |

* cited by examiner

*Primary Examiner*—Tesfaldet Bocure
*Assistant Examiner*—Naheed Ejaz
(74) *Attorney, Agent, or Firm*—Withrow & Terranova, PLLC

(57) ABSTRACT

A DSL modem comprises an additional transformer and additional coils on a coupling transformer to couple a received signal on a transmission line to a receive path without loss due to an active impedance. The ratio of windings on the coils allows gain to be introduced to improve the signal to noise ratio.

27 Claims, 2 Drawing Sheets

METHOD AND DESIGN FOR INCREASING SIGNAL TO NOISE RATIO IN XDSL MODEMS

RELATED APPLICATIONS

The present invention claims priority to U.S. Provisional Patent Application 60/271,604 filed 26 Feb. 2001, which is hereby incorporated by reference in its entirety.

FIELD OF THE INVENTION

This invention relates, generally, to digital subscriber line modems and, more particularly, to the active impedance networks in digital subscriber line modems.

BACKGROUND OF THE INVENTION

A digital subscriber line (DSL) is a technology for bringing high-bandwidth information to homes and small businesses over ordinary copper telephone lines traditionally used for voice communication through the Public Switched Telephone Network (PSTN). Digital data is transported across the PSTN by converting the data into an analog signal that is transmitted by varying, or modulating, the frequency, phase, amplitude or other characteristic of a carrier signal. The modulation is performed by a DSL modem attached to a standard telephone line referred to as a "local loop". When analog signals are received from other DSL modems in the PSTN, the receiving DSL modem performs an opposite function by demodulating the received analog signal to convert it back into digital data. DSL modems are typically installed in pairs, with one of the DSL modems installed in a customer's premises and the other in the telephone company's central office servicing that customer's premises. The pair of DSL modems is connected to opposite ends of the same twisted pair telephone line comprising the local loop. xDSL refers to different variations of DSL and ADSL (asymmetric DSL), G.Lite DSL (ITU-T standard G-002.2), HADSL (high bit-rate DSL) and RADSL (rate adaptive DSL).

To protect the circuitry and prevent current leakage between the transmit ports and the receive ports, a hybrid circuit is used. The hybrid circuit allows the transmitted signal to be conveyed to the transmission line without leaking into the receive port and likewise allows the received signal to be conveyed from the transmission line to the receive port without leaking into the transmit port.

xDSL modems require electrical power to operate. In an effort to reduce the amount of electrical power consumed by xDSL modems, a technique called "active impedance" is sometimes employed. This technique has some disadvantages, including signal attenuation introduced in the receiver path. This signal attenuation is proportional to the level of active impedance generated. Because of the signal attenuation, the signal to noise ratio of the received signal degrades. While active impedance improves power consumption by a ratio of 1.8:1, it increases losses in the receiver path by 12~15 dB. This results in a decrease in the maximum loop reach of the xDSL modem; i.e., the maximum loop is the distance between the modems in the central office and the customer's premises.

Several solutions have been tried in an effort to solve this drawback. One solution is to eliminate the active impedance generation, but this will increase the power consumption of the xDSL modem. Another solution is to increase the gain of the receiver path, but this does not affect the signal to noise ratio. Yet another solution is to improve the noise characteristic of the receiver, but this increases the complexity, cost and power consumption of the modem.

Accordingly, a need exists for a method and design that allows an xDSL modem to employ active impedance generation without affecting the signal to noise ratio and thereby degrading the effective reach of the signal.

SUMMARY OF THE INVENTION

The present invention is a method and design to satisfy the aforementioned need. Accordingly, the present invention is a method and design using additional transformer windings in a hybrid circuit of the xDSL modem to provide significant gain in the receiver path increasing its signal to noise ratio without increasing its power consumption.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention is directed to compensating for the loss of a received signal when the xDSL modem uses an active impedance. For a full explanation of what an active impedance is and how it is incurred, reference is made to the priority document of the present invention, namely U.S. provisional patent application 60/271,604 filed 26 Feb. 2001 and incorporated by reference. For further edification on the subject of active impedance, the interested reader is directed to U.S. patent application Ser. No. 09/276,143 filed 25 Mar. 1999, entitled "HIGH EFFICIENCY LINE DRIVER WITH ACTIVE IMPEDANCE MATCHING" which is herein incorporated by reference in its entirety. In short, by reducing the resistance of the impedance in the transmission circuitry to reduce power consumption, losses are introduced into the receive path. For the sake of notational clarity, if a non-active impedance element is described as $R_O$, an active impedance is denoted $R_O/m$, where m is typically between four and five. The present invention provides a technique by which this loss may be compensated for, without degrading the signal to noise ratio.

Figure 1:
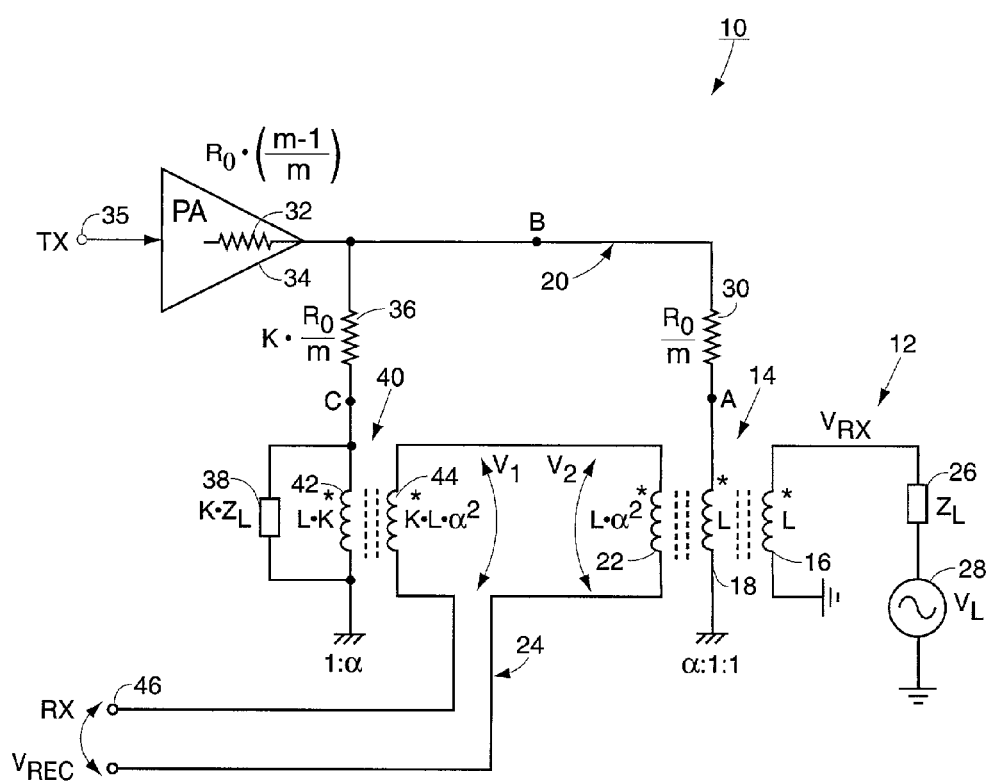
FIG. 1 is a circuit diagram of the present invention in which additional transformer windings are incorporated in an xDSL front end circuit.

An xDSL modem front end 10 in conjunction with a transmission line 12 is illustrated in FIG. 1. Modem front end 10 is coupled to the transmission line 12 via a transformer 14. The transformer 14 includes a first coil 16 located on the transmission line 12 and a second coil 18 located in the transmit path 20 of the modem front end 10. The transformer 14 further includes a third coil 22 located in the receive path 24 of the modem front end 10. The turn ratio of these coils may be expressed as $1:1:\alpha$. It should be appreciated that magnetic flux in one coil caused by a change in voltage causes a change in magnetic flux in the other two coils instantaneously, thus effectuating a voltage transfer, essentially without loss.

The transmission line 12 is a conventional transmission line with a line impedance ($Z_L$) 26 and a line voltage source ($V_L$) 28 that creates a voltage on the transmission line 12. This voltage, labeled $V_{RX}$, is the voltage that conveys the signal to be received to the modem front end 10. In most embodiments, the line impedance 26 will be a real value, but in some embodiments it may be complex at certain frequencies. The present invention covers both situations.

The transmit path 20 comprises an active impedance of a first resistor ($R_O/m$) 30 and a virtual resistor ($R_O^*(m-1)/m$) 32 located within a transmit power amplifier (PA) 34. The active impedance is designed to match the line impedance 26 and thus may be real only, complex only, or a combination of real and complex as needed or desired. Thus, it should be appreciated that the resistors identified in the specification are all broadly impedances. Further, the virtual resistor 32 is a synthesized or simulated resistor as explained in the previously incorporated '143 application.

The transmit power amplifier 34 receives a signal from a transmit port 35. The transmit path 20 further comprises a second resistor 36 and a line balancing impedance 38. The inclusion of these elements is well understood. Second resistor 36 is a multiple K times larger than the first resistor 30, while the line balancing impedance 38 is the same multiple K larger than the line impedance 26. In an exemplary embodiment, K is approximately 10.

A second transformer 40 couples a signal from the transmit path 20 to the receive path 24 by conveying a signal in a first coil 42 to a second coil 44. The first coil 42 to the second coil 44 turn ratio may be expressed as 1:α. Further, the first coil 42 may have an inductance of K times the inductance of the first and second coils 16, 18 of the first transformer 14.

As illustrated, the third coil 22 of the first transformer 14 and the second coil 44 of the second transformer 40 may be arranged in series, each having a voltage drop thereacross (labeled $V_{1\ and\ V2}$). The received signal ($V_{REC}$) received at the receive (RX) port 46 may be calculated as the difference of $V_1$ and $V_2$. $V_1$ is known to be the voltage at node C, namely $V_C$, multiplied by α. $V_2$ is known to be the voltage at node A, namely $V_A$ multiplied by α.

If the incoming signal to be received has a voltage of $V_{RX}$, then the voltage at $V_A$ is $V_{RX}$ by virtue of the 1:1 ratio of the coils 16, 18. Current will then flow through the first resistor 30 into node B. From node B, the current has two paths, one into the PA 34 and the virtual resistor 32 and the other into the second resistor 36. Because K is approximately ten, the current flowing into second resistor 36 is negligible. The PA 34 can sink the current as needed or desired. Thus, the voltage at node B is a divider made by the virtual resistor 32 and the first resistor 30. Thus, $V_B=V_A(m-1)/m$.

The first coil 42 of the transformer 40 has a very high impedance, such that no current flows thereinto. Thus, the voltage at node C is a divider between second resistor 36 and the line balancing impedance 38. Therefore, the voltage at node C is shown as follows when the proper substitutions are made:

$$V_C = V_B \frac{m}{m+1}$$

Thus, the voltage at node C can be expressed as a function of the voltage in node A, namely, $$V_C = V_A \frac{m-1}{m+1}$$

When the proper substitutions are made, $V_{REC}$ can be determined as a function of $V_{RX}$.

$$V_{REC} = V_1 - V_2 = \alpha V_{RX} \frac{m-1}{m+1} - \alpha V_{RX} = V_{RX} \frac{2\alpha}{m+1}$$

Thus, the use of the third coil 22, with a number of windings greater than the number of windings in first and second coils 16, 18 respectively, allows gain to be achieved while keeping the hybrid function. This method provides for gain of a in the receive path 24, thus improving the signal to noise ratio by 20logα. In an exemplary embodiment, a is approximately 2–3, but this adequately compensates for the loss introduced by the active impedance, namely the 2/(m+1) term. In an exemplary embodiment, m=4 and α=2.5, which results in a net of no loss in the received signal. This also provides for the advantage wherein there is no active stage and the possibility of either a single-ended or differential-ended signal at the RX port 46.

Figure 2:
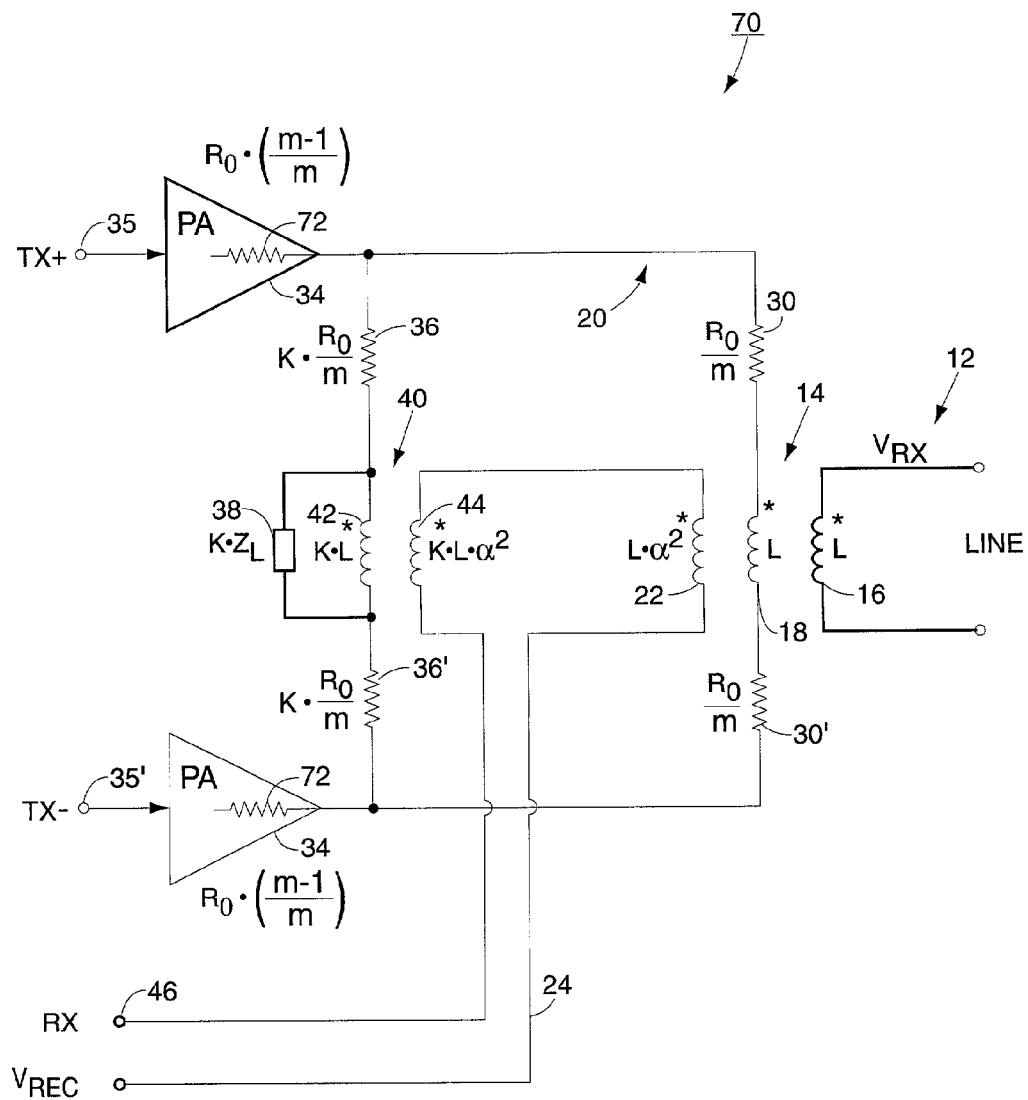
FIG. 2 is a circuit diagram of the present invention in a full differential mode line driver.

FIG. 2 illustrates a full differential mode line driver 70. This is substantially similar to the embodiment disclosed in FIG. 1 and operates essentially the same, except that there are two transmit amplifiers 72 which operate in differential mode and receive signals from transmit ports 35, 35'. To effectuate proper balancing, an additional first resistor 30' is positioned in series with the second coil 18 in the transmit path 20. Likewise, an additional second resistor 36' is added in series with the first coil 42 of the second transformer 40.

Those skilled in the art will recognize improvements and modifications to the preferred embodiments of the present invention. For example, many transistor technologies and types may benefit from the present invention. All such improvements and modifications are considered within the scope of the concepts disclosed herein and the claims that follow.

What is claimed is:

1. A modem comprising:
   a first transformer comprising a first coil, a second coil and a third coil;
   a second transformer comprising a fourth coil and a fifth coil;
   said fifth coil and said third coil comprising a receive path operatively coupled to a receive port;
   said fourth coil and said second coil comprising a transmit path operatively coupled to a transmit port;
   said transmit path further comprising an active impedance element introducing a loss onto said receive path; and
   said third and fifth coils introducing a gain into said receive path.

2. The modem of claim 1, wherein said modem comprises an xDSL modem.

3. The modem of claim 1, wherein said transmit port comprises a differential transmit port.

4. The modem of claim 1, wherein said gain offsets said loss.

5. The modem of claim 1, wherein said gain is created in said third coil and comprising more windings than said first and second coils and said fifth coil comprising more windings than said fourth coil.

6. The modem of claim 1 wherein said receive port comprises a differential port.

7. The modem of claim 1 wherein said transmit path further comprises a power amplifier.

8. The modem of claim 1 wherein said first, second and third coils comprise windings in a ratio of $1:1:\alpha$.

9. The modem of claim 1 wherein said fourth and fifth coils comprise windings in a ratio of $1:\alpha$.

10. The modem of claim 9 wherein said first, second and third coils comprise windings in a ratio of $1:1:\alpha$.

11. The modem of claim 10 wherein a is between approximately 2 and 3.

12. A method of using a modem, comprising:
  receiving a signal over a transmission line;
  coupling the signal through a first transformer to a transmit path and a receive path; and
  coupling the signal from the transmit path to the receive path with a second transformer to reduce losses introduced by an active impedance element in the transmit path.

13. The method of claim 12, wherein coupling the signal through a first transformer comprises coupling the signal from a first coil to a second and third coil.

14. The method of claim 13, wherein said third coil comprises a larger number of windings than said first coil.

15. The method of clam 15, wherein coupling the signal from the transmit path to the receive path comprises coupling the signal from a first coil to a second coil.

16. The method of claim 15, wherein coupling the signal from a first coil to a second coil comprises coupling the signal from a first coil to a second coil that comprises more windings than said first coil.

17. The method of claim 14 further comprising passing the signal on the receive path to a receiver port.

18. A transformer positioned in a modem, said transformer comprising:
  a first coil comprising a set of first windings;
  a second coil comprising a set of second windings;
  a third coil comprising a set of third windings;
  said first, second, and third windings having a ratio of $1:1:\alpha$, wherein $c\alpha$ is greater than 1 and said third coil is positioned in a receive path of the modem wherein a signal from a transmit path is coupled to the receive path with the second coil to reduce losses introduced by an active impedance element in the transmit path.

19. The transformer of claim 18 wherein said second coil is associated with a transmit path of the modem.

20. The transformer of claim 18 wherein said first coil is associated with a transmission line connected to the modem.

21. A modem comprising:
  a first transformer having first, second, and third coils, the first coil for coupling to a network having a load impedance with a value, $Z_L$;
  a second transformer having a fourth and fifth coil, the fifth coil operatively coupled to the third coil and forming a receive port,
  a transmit power amplifier having an output coupled to the second coil through a first impedance and to the fourth coil through a second impedance; and
  a third impedance coupled in parallel with the fourth coil.

22. The modem of claim 21 wherein the transmit power amplifier has an active impedance with a value of $R_0((m-1)/m)$, the first impedance has a vale of $R_0/m$, the second impedance has a value of $K(R_0/m)$, and the third impedance has a value $KZ_L$.

23. The modem of claim 21 wherein each of the third and fifth coils have first ends, which are coupled together, and second ends, which form the receive port.

24. The modem of claim 21 wherein the first, second, and third coils have a $1:1:\alpha$ winding ratio.

25. The modem of claim 21 wherein the second and fourth coils each have first and second ends, the output of the transmit power amplifier is coupled to the first end of the second coil through the first impedance and coupled to the first end of the fourth coil through the second impedance, and further comprising a second transmit power amplifier having a second output coupled to the second end of the second coil through a fourth impedance and to the fourth coil through a fifth impedance.

26. The modem of claim 25 wherein each transmit power amplifier bas an active impedance with a value of $R_0((m-1)/m)$, the first and fourth impedances each have a value of $R_0/m$, the second and fifth impedances each have a value of $K(R_0/m)$, and the third impedance has a value $KZ_L$.

27. The modem of claim 1 wherein the first transformer is distinct from the second transformer.

* * * * *